July 12, 1927.  1,635,221
F. C. PEARSON
HYDRAULIC BRAKE SYSTEM FOR MOTOR VEHICLES
Filed June 26, 1925  2 Sheets-Sheet 1

Inventor
Frank C. Pearson
By Spencer Sewall & Hardman
his Attorneys.

July 12, 1927. 1,635,221
F. C. PEARSON
HYDRAULIC BRAKE SYSTEM FOR MOTOR VEHICLES
Filed June 26, 1925 2 Sheets-Sheet 2
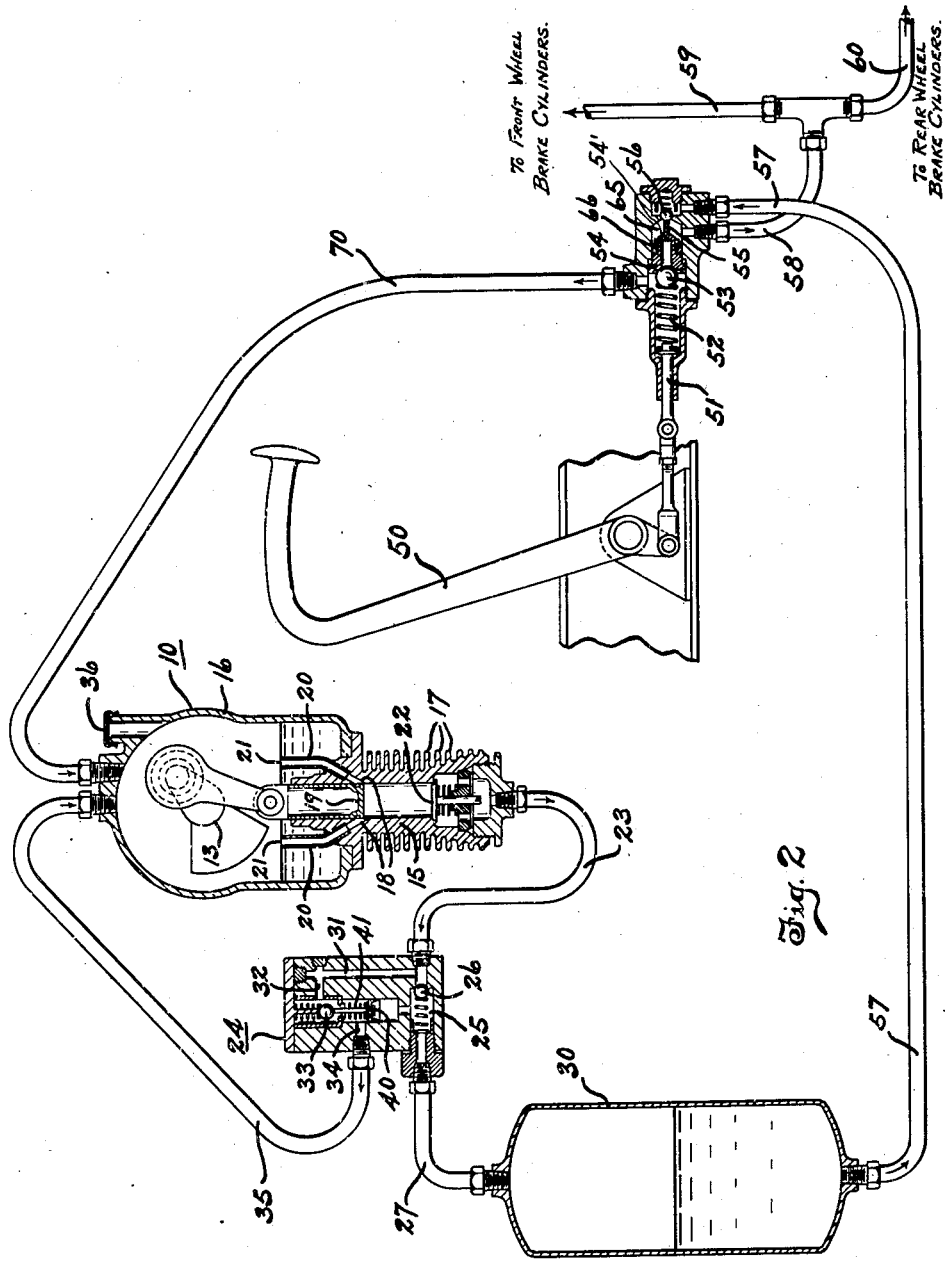
Inventor
Frank C. Pearson
By Spencer Sewall & Hardman
his Attorneys.

Patented July 12, 1927.

1,635,221

UNITED STATES PATENT OFFICE.

FRANK C. PEARSON, OF DAYTON, OHIO, ASSIGNOR TO GENERAL MOTORS RESEARCH CORPORATION, OF DAYTON, OHIO, A CORPORATION OF DELAWARE.

HYDRAULIC BRAKE SYSTEM FOR MOTOR VEHICLES.

Application filed June 26, 1925. Serial No. 39,834.

This invention relates to hydraulic braking systems for motor vehicles.

The general object of this invention is to provide a hydraulic brake system having a reserve supply of oil under pressure which will be sufficient to apply the vehicle brakes a safe number of times even after the pump which supplies the oil under pressure has ceased to function.

A more specific object is to provide an improved form of servo-pump which pumps both oil and air into the pressure reservoir and automatically maintains the proper proportions of oil and air in said reservoir and at a pressure between predetermined limits.

Another object is to provide a manually operated brake control for the above system by which the operator may "feel" the intensity of brake application by the force resisting the braking movement of the manual means in a manner similar to the "feel" of mechanical brakes.

Further objects and advantages of the present invention will be apparent from the following description, reference being had to the accompanying drawings, wherein a preferred form of embodiment of the present invention is clearly shown.

In the drawings:

Fig. 2 is a diagrammatic view showing the principal parts of the mechanism in section.

Similar reference characters refer to similar parts throughout the drawings.

Figure 1:
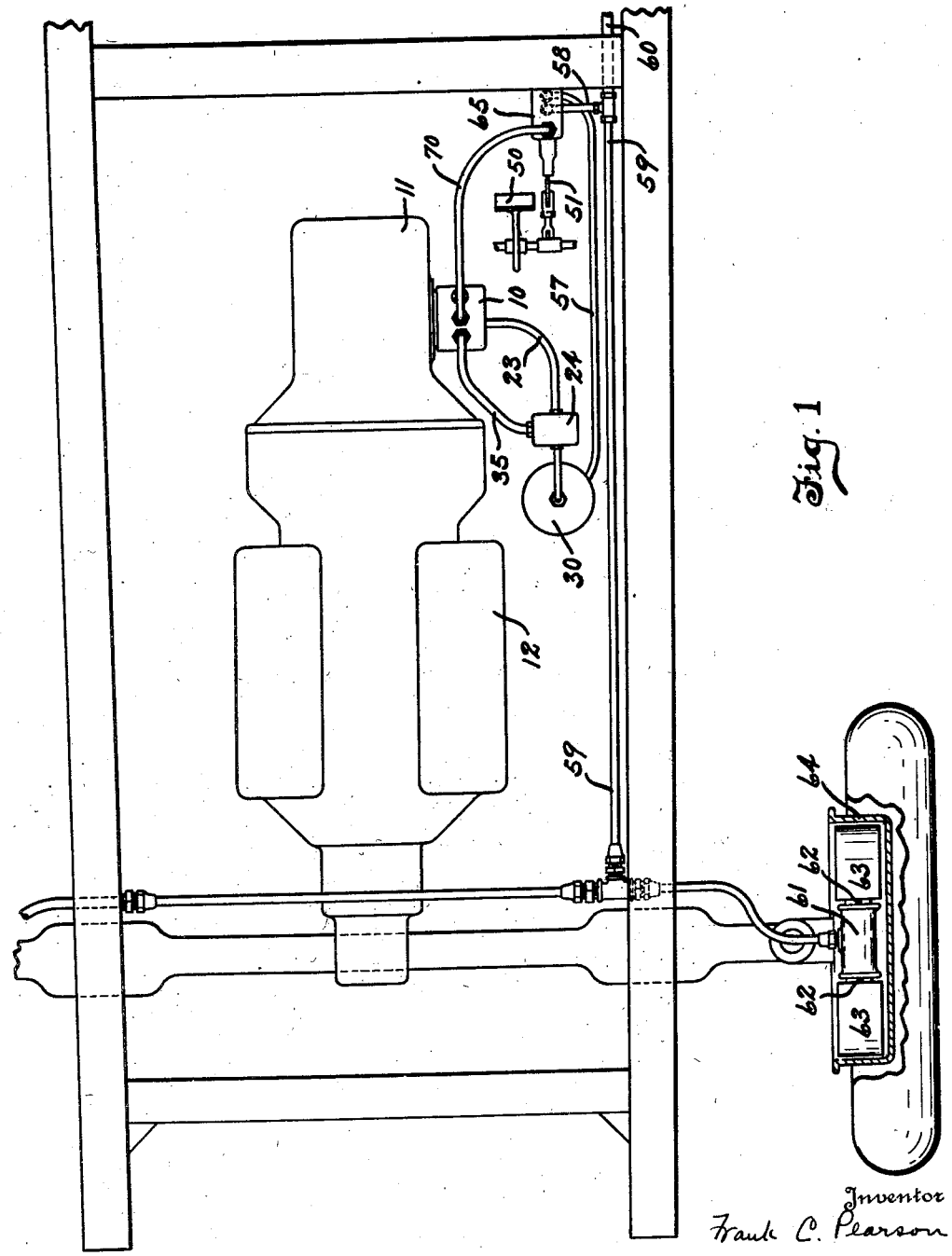
Fig. 1 is a somewhat diagrammatic plan view showing this invention applied to an automobile chassis.

In Fig. 1, an oil and air pump 10 is mounted upon the transmission casing 11 of the engine 12. The pump shaft 13 is driven continuously by the engine transmission by suitable gearing (not shown). The pump cylinder 15 hangs vertically downward from the crank case 16 and is provided with air cooling fins 17 which are exposed to the air stream flowing under the engine crank case due to the forward motion of the car. The cylinder 15 is provided with one or more intake ports 18 (two being shown in Fig. 2) which are uncovered by the piston 19 when at the top position. Each port 18 has an inlet duct 20 which extends upwardly into the pump crank case 16 preferably to a point above the open end of cylinder 15. The crank case 16 may therefore remain filled with oil up to the open ends 21 of the ducts 20 and thus provide proper lubrication for all moving parts of the pump. When the oil level in crank case 16 is above the open ends 21 the inlet ducts 20 will fill with oil and at each uncovering of ports 18 oil will enter cylinder 15 and be pumped through the spring pressed outlet valve 22 to the delivery duct 23. When the oil level in crank case 16 has fallen even with the open ends 21 air or air together with oil spray will enter ducts 20 and be pumped by piston 19 to the delivery duct 23.

Duct 23 leads to the automatic pressure regulator indicated as a whole by numeral 24. This regulator comprises a duct 25, having a check valve 26 therein, leading to duct 27 which delivers into the pressure reservoir 30. Ducts 31, 32, by-pass control valve 33, and duct 34, lead around check valve 26 to the by-pass return duct 35 which leads back to the pump crank case 16.

When this system is first put into operation, oil is poured into crank case 16 through the suitably vented filler cap 36 until the pump has delivered the desired amount of oil to the pressure tank 30 through duct 23, check valve 26, and duct 27. Preferably tank 30 normally remains about half full of oil. When the oil level in crank case 16 falls to expose the intake ends 21 of ducts 20, air instead of oil will enter cylinder 15 and be pumped into tank 30 in the same manner as the oil was pumped therein. A high air pressure is thus built up in tank 30, preferably about 500 to 600 lbs. per square inch. When the desired maximum pressure is reached this pressure acting against the plunger 40 overcomes and compresses the rather strong spring 41, thus causing the by-pass control valve 33 to be forced off its seat. (Fig. 2 shows valve 33 lifted off its seat). The air delivered by pump 10 will now circulate freely through ducts 23, 31, 32, by-pass valve 33, duct 34, and duct 35 back to the crank case 16. It is thus seen that the pump 10 will continue to run idly after the desired maximum pressure is obtained in tank 30.

When it is desired to apply the brakes, the operator depresses foot pedal 50 which moves the spring seat plunger 51 to the right (as viewed in Fig. 2) thereby compressing spring 52 and moving the ball valve 53 and piston 54 as a unit to the right. This causes the lug 55 on piston 54 to push the control valve 56 off its seat, thus admitting oil under pressure from the duct 57 to the small cylinder 65 and thence to the duct 58, through branches 59 and 60, to the front and rear brake operating cylinders 61. Fig. 1 illustrates one of the front wheel brake operating cylinders 61, those on the rear wheels being similar thereto. The oil pressure admitted to cylinder 61 forces apart the two plungers 62 thereby expanding the brake shoes 63 against the inner surface of the brake drum 64. Since such hydraulic brake operating cylinders are well known in the art and their specific construction forms no part of the present invention they will not be described in further detail herein. The oil under pressure in cylinder 65 acts against the piston 54, which is provided with a cup leather packing 66, and therefore resists the braking movement of pedal 50. The oil of course tends to pass through opening 54' in piston 54 to unseat ball valve 53 in piston 54 but is prevented from doing this when spring 52 is compressed by the pedal 50 being held in depressed position. It is therefore seen that the oil pressure in cylinder 65 acts against the total sectional area of piston 54 and hence resists the braking or downward movement of pedal 50 with a force which is proportional to that applied to the brake shoes 63. The operator is therefore enabled to "feel" the brakes by the resistance to the foot pedal, as in mechanical brakes.

When the operator relieves the force upon pedal 50 the oil pressure in cylinder 65 immediately forces piston 54 to the left thus permitting check valve 56 to close and shut off the high pressure from pressure tank 30. Now as the brake shoes contract under the urge of the usual springs (not shown) the brake plungers 62 are forced together and oil under relatively low pressure is forced back through the pressure lines to cylinder 65. Since the tension on spring 52 has now been relieved by the movement of the spring seat plunger 51 to the left, the oil returned to cylinder 65 is now capable of passing through opening 54', unseating ball valve 53 and passing on back through duct 70 to the pump crank case 16, as clearly shown in Fig. 2.

The operator by progressively depressing pedal 50 may admit progressively increasing oil pressures to the brake pressure line 58. This action will be as follows: Assume pedal 50 is depressed about an inch and held. The spring 52 resting on ball valve 53 is partly compressed and forces piston 54 to the right to lift valve 56 off its seat, allowing oil under pressure to be forced into cylinder 65 and thence to the brakes through the pressure line 58, thus building up a pressure in cylinder 65. But this pressure will cease building up as soon as the force against piston 54 overcomes the partially compressed spring 52 and permits valve 56 to close again. The spring 52 being partially compressed acts on the oil in cylinder 65 and thus maintains the pressure in the brake lines, and since spring 52 also exerts an equal force on plunger 51 the operator will "feel" a resisting force proportional to the pressure in the brake lines.

Now should a greater braking effect be desired the pedal 50 is further depressed requiring additional pedal pressure to further compress spring 52. Since spring 52 is already compressed to a point where valve 56 is barely seated, this additional compression of spring 52 will again open valve 56 and the cycle described in the preceding paragraph is again repeated except at a higher pressure in cylinder 65. Therefore the farther pedal 50 is depressed the higher the pressure in the brake lines and the greater the force required to hold pedal 50 in depressed position.

The oil returned to crank case 16 through return duct 70 when the brakes are released of course temporarily raises the oil level above the open ends 21 of pump intake ducts 20. The pump 10 will therefore immediately begin pumping this returned oil back into the pressure tank 30 until the oil level has again fallen to its normal position, as shown in Fig. 2. Disregarding possible leakage of oil from the pressure lines, the return to tank 30 of the oil used in applying the brakes one time will again bring the pressure in tank 30 back to the original maximum pressure therein.

When it is desired to replenish oil lost in leakage, it is merely added to the crank case 16 through the filler 36 and the pump forces it over into tank 30 as soon as the pressure therein falls below its predetermined maximum value due to applying the brakes.

While the form of embodiment of the present invention as herein disclosed, constitutes a preferred form, it is to be understood that other forms might be adopted, all coming within the scope of the claims which follow.

What is claimed is as follows:

1. In a hydraulic braking system for motor vehicles, in combination, a pressure reservoir containing oil and air under pressure, a brake cylinder, a duct leading from said reservoir to said cylinder, a manually operated control valve in said duct operable to permit the actuation of the brake cylinder, a pump for pumping both oil and air to said reservoir, and a pressure regulator for automatically limiting the pressure built up by said pump in said reservoir.

2. In a hydraulic braking system for motor vehicles, in combination, a pressure reservoir containing oil and air under pressure, a brake cylinder, a duct leading from said reservoir to said cylinder, a manually operated control valve in said duct operable to permit the actuation of the brake cylinder, a pump for pumping both oil and air to said reservoir, an oil return duct for returning oil from the brake cylinder to the pump intake when the brake is released, and a pressure regulator for limiting the pressure built up by said pump in said reservoir.

3. In a hydraulic braking system for motor vehicles, in combination, a pressure reservoir containing oil and air under pressure, a brake cylinder, a duct leading from said reservoir to said cylinder, a manually operated control valve in said duct operable to permit the actuation of the brake cylinder, a relatively small servo-pump for maintaining a supply of oil and compressed air in said reservoir, and means for returning the oil from the brake cylinder to the inlet of said pump when the brake is released.

4. In a hydraulic braking system for motor vehicles, in combination, a pressure reservoir containing oil and air under pressure, a servo-pump for delivering both oil and compressed air to said reservoir, and a pressure regulator for preventing delivery of oil and air from said pump to said reservoir when the pressure reaches a predetermined value.

5. In a hydraulic braking system for motor vehicles, in combination, a pressure reservoir containing oil and air under pressure, a servo-pump for delivering both oil and compressed air to said reservoir, and a pressure regulator automatically controlled by the reservoir pressure for maintaining the pressure in said reservoir within predetermined limits.

6. In a hydraulic braking system for motor vehicles, in combination, a pressure reservoir containing oil and air under pressure, a pump for pumping oil and air to said reservoir, said pump having an intake duct having its intake port intermittently submerged in oil and exposed to air, so that when said intake port is submerged said pump will pump oil and when said intake port is exposed to air said pump will pump air.

7. In a hydraulic braking system for motor vehicles, in combination, a pressure reservoir containing oil and air under pressure, a pump for pumping oil and air to said reservoir, said pump comprising: a crank case partly filled with oil, an inverted cylinder depending from said crank case, an intake duct having its intake port so located as to be submerged by the oil level in said crank case at certain times so as to cause said pump to pump oil, and at other times to be exposed to the air above the oil level so as to cause said pump to pump air.

8. In a brake system for vehicles, a gas and liquid reservoir, means to maintain in said reservoir a predetermined volume of liquid, and also gas at a predetermined pressure, braking means and a conduit including an operating valve between said reservoir and braking means.

9. The invention defined in claim 8, there being a fluid return pipe from said operating valve to said first named means whereby fluid used in applying the brake passes from the reservoir, through the conduit, and is restored to the reservoir upon reverse of the braking.

10. In a vehicle brake system, a gas and liquid pump, a reservoir for gas and liquid for actuating brakes, a conduit between said pump and reservoir, said conduit having therein a pressure regulator, said pressure regulator comprising a valve-controlled through passage for flow to said reservoir, and a valve controlled by-pass through which fluid is returned to said pump, the last named by-pass valve being opened by excess pressure on the reservoir side of the first mentioned valve.

In testimony whereof I hereunto affix my signature.

FRANK C. PEARSON.